United States Patent
Fallah et al.

(10) Patent No.: US 10,708,070 B2
(45) Date of Patent: Jul. 7, 2020

(54) SYSTEM AND METHOD FOR UTILIZING CONNECTED DEVICES TO ENABLE SECURE AND ANONYMOUS ELECTRONIC INTERACTION IN A DECENTRALIZED MANNER

(71) Applicant: NXM TECHNOLOGIES INC., Toronto (CA)

(72) Inventors: Jay Fallah, Toronto (CA); Scott Rankine, Toronto (CA); Josef Zankowicz, Toronto (CA)

(73) Assignee: NXM LABS CANADA INC., Toronto (CA)

(*) Notice: Subject to any disclaimer, the term of this patent is extended or adjusted under 35 U.S.C. 154(b) by 244 days.

(21) Appl. No.: 15/988,427

(22) Filed: May 24, 2018

(65) Prior Publication Data

US 2018/0343126 A1 Nov. 29, 2018

Related U.S. Application Data

(60) Provisional application No. 62/510,269, filed on May 24, 2017.

(51) Int. Cl.
| | |
|---|---|
| *H04L 29/06* | (2006.01) |
| *H04L 9/32* | (2006.01) |
| *H04L 9/30* | (2006.01) |
| *H04L 29/08* | (2006.01) |
| *H04L 9/00* | (2006.01) |

(52) U.S. Cl.
CPC ............ *H04L 9/3265* (2013.01); *H04L 9/006* (2013.01); *H04L 9/30* (2013.01); *H04L 9/3239* (2013.01); *H04L 67/1044* (2013.01); *H04L 2209/38* (2013.01); *H04L 2209/56* (2013.01)

(58) Field of Classification Search
CPC ........................... H04L 9/3265; H04L 9/3239
USPC .......................................................... 713/171
See application file for complete search history.

(56) References Cited

U.S. PATENT DOCUMENTS 10,046,228 B2 * 8/2018 Tran ..................... A63B 71/085
2019/0349426 A1 * 11/2019 Smith ..................... H04L 69/22

* cited by examiner

*Primary Examiner* — Longbit Chai
(74) *Attorney, Agent, or Firm* — Jenna L. Wilson; Wilson Lue LLP (57) ABSTRACT

A system and method for utilizing connected devices to enable secure and anonymous electronic interaction in a decentralized manner without the need for usernames and passwords. The method comprises Blockchain, Merkle Trees and Public Key infrastructures and methods that utilize peer-to-peer network protocols. The methods include interactions of two self-sovereign identity groups; persons and devices, with each having their own authorization layer. The devices employ two domains of identity and authorization with each said device having its own self-assigned machine identity. There are three domains of Identity, Authentication and Authorization employed for persons. The final linking of the two groups requires access to be granted by the device in a distributed autonomous manner.

19 Claims, 7 Drawing Sheets

SYSTEM AND METHOD FOR UTILIZING CONNECTED DEVICES TO ENABLE SECURE AND ANONYMOUS ELECTRONIC INTERACTION IN A DECENTRALIZED MANNER

PRIORITY CLAIM

This application claims priority to U.S. Provisional Application No. 62/510,269, filed May 24, 2017, which is hereby incorporated by reference in its entirety.

BACKGROUND OF THE INVENTION

Field of the Invention

The present disclosure is related to the field of electronic interaction between devices in a peer-to-peer network. In particular, a system and method for utilizing connected devices to enable secure and anonymous electronic interaction in a decentralized manner.

Description of Related Art

Ever since the invention of the Internet, service providers have required individuals to create digital identities by undergoing cumbersome, repetitive registrations involving the creation of usernames and passwords for purposes of authentication, verification and authorization. Spread out between multiple service providers, each with its own information silo, our individual digital identities have become increasingly fragmented and vulnerable to attack. Individual awareness of the data attributes and processes needed to protect digital identities varies, with people frequently using the same password credentials across multiple sites, thus making it easier for hackers to hijack their identities. Organizations that employ centralized servers for access control provide strong economic incentives for hackers to attempt to penetrate these systems. Compounding this problem is the rapid proliferation of Internet of Things ("IoT") devices that provide new vectors of attack. The prospect of having tens of billions of these devices controlled by centralized identity and network providers, each of which represents a single point of failure, is daunting.

Decentralized technologies such as blockchains offer a solution to this problem, providing a migration path away from centralized services, creating what is commonly referred to as a self-sovereign identity that gives individual's greater transparency and control over their digital identities. By decentralizing identities, it makes them far less attractive to hackers given the effort required to compromise identities one by one rather than focusing on service providers that offer a single point of failure. This capability has given rise to what are known as Distributed Trust Systems.

In a Distributed Trust model all participants must abide by a set of identity attributes to authenticate, verify and authorize individuals to perform transactions based on a single ledger shared by all parties. Unlike a database with a single point of control, there is no hierarchy. All participants have the same capabilities and control over their identities.

In conventional blockchains a user maintains anonymity by means of public-key infrastructure (PKI) encryption used to conduct transactions. These systems are known as permission-less blockchains in which all participants remain anonymous. The blockchain automatically enforces settlements between participants using secure, publicly verifiable algorithms that enforce open rules and participant behavior that cannot be circumvented. It eliminates the risk associated with transactions by offering proof of ownership via cryptographic key. These systems are also programmable, providing transparent mechanisms or "smart contracts" that support a myriad of use cases, including point-to-point real-time crypto currency transfers, supply chain management, Business to Business (B2B) remittance, asset transfers and micropayments, to name but a few.

A blockchain is a consensus, peer-to-peer (P2P) decentralized ledger whose public verifiability comes with costs, including latency, as parties must wait until several blocks have been created before a transaction is settled. This latency undermines many commercial applications, which require real-time, or near real-time execution, that has contributed to the development of permissioned private blockchains that limit their participation to private groups. However, permissioned private blockchains risk the loss of anonymity associated with a permission-less system. As a means of access control, the user's online identity can be linked to an individual public-key, which creates vulnerabilities that can be exploited to obtain the identity of the user. In addition, these systems focus on the self-sovereign identity of persons, not devices, leaving this potential vector of attack unresolved.

It is, therefore, desirable to provide a system and method for utilizing connected devices to enable secure and anonymous electronic interaction in a decentralized manner that overcomes the shortcomings of the prior art.

Other aspects and features of the present invention will become apparent to those ordinarily skilled in the art upon review of the following description of specific embodiments of the invention in conjunction with the accompanying figures.

BRIEF SUMMARY OF THE INVENTION

To overcome the limitations, we have developed a decentralized autonomous self-sovereign identity system that maintains user anonymity by means of a public blockchain tree that is private to the participants in the private network defined by the identity of the device. Blockchains in this model will remain in the public domain when they are admitted to the public network of device blockchains through common consensus. The decentralized autonomous self-sovereign identity system can be more fault tolerant, resistant to attack and resistant to collusion.

Broadly stated, in some embodiments, a method can be provided for anonymous electronic interaction between connected devices in a peer-to-peer network in a decentralized manner, the method can comprise identifying, creating, by computer, a genesis block of a private blockchain, the genesis block being addressed by a hash of a unique qualifier of an connected device; generating, by the computer, a public key and a private key for the connected device; hashing the first public key of the connected device; adding the hash of the public key to a life block, the hash of the public key being a self-identity of the connected device, the life block being added to the private blockchain as the block following the genesis block, the life block being addressed by the hash of the public key; distributing the blockchain to a plurality of peers in a stake driven network; and controlling access to the connected device based on permissions stored in the private blockchain.

Broadly stated, in some embodiments, an address to a public blockchain is included in the genesis block, and a plurality of device information is added to a new public block of the public blockchain by the connected device, the new public block comprising the self-identity of the connected device.

Broadly stated, in some embodiments, the method can further comprise generating, by a computer, a second public key and a second private key for a first user device; sending a hash of the second public key, the hash of the second public key being a user device self-identity to the private blockchain using the address the genesis block; assigning, by the connected device, the first user device as an owner of the connected device and adding a new private block to the private blockchain the new private block comprising the user device self-identity and ownership permissions assigned to the user self-identity.

Broadly stated, in some embodiments, the method can further comprise: adding, by the computer, at least one additional block to the private blockchain, wherein the adding of the at least one additional block to the private blockchain requires a proof of stake to be received, wherein the proof of stake is refunded when the addition is accepted and retained when the addition fails.

Broadly stated, in some embodiments, the method can further comprise: submitting, by the computer, public data to a public blockchain, wherein the connected electronic device verifies that an issuer has permission to request that the public data be sent to a public blockchain, the public data is examined by one or more inspector computer nodes to ensure the data is valid, wherein valid public data is added, by the computer, to a new block of the public blockchain.

Broadly stated, in some embodiments, the second digital identity is associated with a mundane identity of the first person.

Broadly stated, in some embodiments, a computer system can be provided for anonymous electronic interaction between persons and connected devices in a peer-to-peer network in a decentralized manner, the computer system can comprise: a connected device, the connected device comprising a digital electronic circuit, at least one computer-readable storage medium operatively coupled to the digital electronic circuit, and a communication module, wherein the digital electronic circuit generates a self-assigned first digital identity on the connected device and the identity stored in a genesis block of a private blockchain; and a person's device capable of communicating with the connected device over a peer to peer network, the person's device associated a second digital identity associated with a first person, the second digital identity being designated as an owner of the connected device wherein a second block is added to the private blockchain giving ownership permissions to the second digital identity, wherein the ownership permissions comprise an ability to at least one of grant and revoke permissions for a plurality of persons.

Broadly stated, in some embodiments, the second digital identity is also associated with a mundane identity of the first person.

Broadly stated, in some embodiments, a method can be provided for logistics and supply chain management, the method can comprise: generating, by a computer, a digital identity and linking said digital identity to a product; affixing, by the computer, an identifier to the product, the identifier providing a link to the digital identity; adding, by the computer, a first block to a public blockchain associated with a network of computing devices, wherein the first block contains the digital identity; and reading, by the computer, the identifier and adding one or more blocks to the public blockchain comprising information associated with the product.

Broadly stated, in some embodiments, a method for digital rights management, the method can comprise the steps of: connecting, by a computer, a public blockchain on distributed network of computing devices; generating, by the computer, a digital identity and associating said digital identity to a digital asset; embedding, by the computer, the digital identity within the digital asset; adding, by the computer, a first block to the public blockchain containing the digital identity, the first block also defining access rights to the digital asset; receiving, by the computer, a request to access the digital asset; and verifying, by the computer, in the public blockchain that the received requested access is in accordance with the access rights, wherein access to the digital access is granted upon verification.

Broadly stated, in some embodiments, a connected device can be provided for anonymous electronic interaction in a peer-to-peer network in a decentralized manner, the connected device can comprise: a digital electronic circuit; a communication module; at least one computer-readable storage medium operatively coupled to the digital electronic circuit, said at least one computer-readable storage medium containing a representation of at least one set of computer instructions that, when executed by said digital electronic circuit, causes the connected device to perform the operations of: generating a first digital identity; saving the first digital identity in a life block which is added to a private blockchain stored on the computer readable storage medium; and adding data to a public blockchain.

The connected device according to claim 9 wherein the digital electronic circuit executes the at least one set of instructions to cause the computer system to further perform the operation of:

associating a first person's device to the connected device, the person's device having a second digital identity associated with a first person, the second digital identity being designated as an owner of the connected device; and adding a second block to the private blockchain giving ownership permissions to the second digital identity, wherein the ownership permissions comprise an ability to at least one of grant and revoke permissions for a plurality of persons.

DETAILED DESCRIPTION OF THE INVENTION

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

A system to enable secure and anonymous electronic interaction with a connected device in a decentralized manner can comprise a connected device. The connected device can be any connected device such as those known as Internet of Things (IoT) devices.

A method of anonymous electronic interaction between persons and connected devices in a peer-to-peer network without the need for usernames and passwords. The method divides interactions into two Self-Sovereign identity groups; persons and devices, with each having its own authorization layer, using Blockchain, Merkle Trees and Public Key Infrastructures. For devices, two domains of Identity and Authorization are employed with each device having its own self-assigned machine identity. For persons, three domains of Identity, Authentication and Authorization are employed. Final linking of the two requires access to be granted by the connected device in a distributed autonomous manner.

The connected device can comprise a processor, a memory module, a wireless communication module, and other input and output modules. When the device is manufactured, a genesis block of a blockchain can be stored in the memory of the device. The genesis block defines the device type. When the connected device is powered up for the first time, an executable code is executed on the connected device which can communicate to a central server. The central server can verify the connected device and authorize the initialization of a self-sovereign identity. The connected device can be programmed to then generate its identity. This identity can remain private from the central server. The identity can be created through asymmetric encryption such as a public-private key pair and create an identity defined by the hash of its public key. This process can create the initial life block, containing a link to the Genesis block, for the connected device. Within this architecture, the self-sovereign identity authenticates the connected device for the network with zero permissions.

A person can have a number of identities. These identities, or Mundane Identities, can be identities created to access various internet service providers such as webmail providers or social media networks, or apps. A person's device, such as a mobile phone or other computing device, can assign its own digital identity through the generation of a public-private key pair. This digital identity can be generated based on the device alone, or in conjunction with one of the person's Mundane Identities. For example, if the person's device is a mobile phone, the identity can be associated uniquely to the mobile phone or the mundane identity of a person's app can be the basis for the self-assigned identity. The combination of a Mundane Identity and a person's device can represent a person's digital identity.

A person's device can be associated with the connected device through an initial encounter. In some embodiments the initial encounter can be by scanning a QR code located on the device. This first user device to link to the connected device can become the owner of the connected device. The owner of the connected device controls the permissions to the connected device. As permissions are added, blocks are added to a private blockchain.

When the device is manufactured, in addition to the connected device type, the genesis block can also define the stakeholders permissions for reaching consensus. The stakeholders can include the connected device vendor, the wireless services provider, sponsor company, or other person to be granted access to the data of the device.

In addition to the private blockchain, which controls permissions for the connected device, a public blockchain is created. The public blockchain can comprise data from a number of peer connected device. The data is anonymous as it identifies only the hash of the connected device identity. Adding data to the blockchain is verified by consensus of the nodes in the blockchain to ensure the data is valid. A stakeholder can only know the identity of the connected device by requesting permission of the owner.

Figure 1:
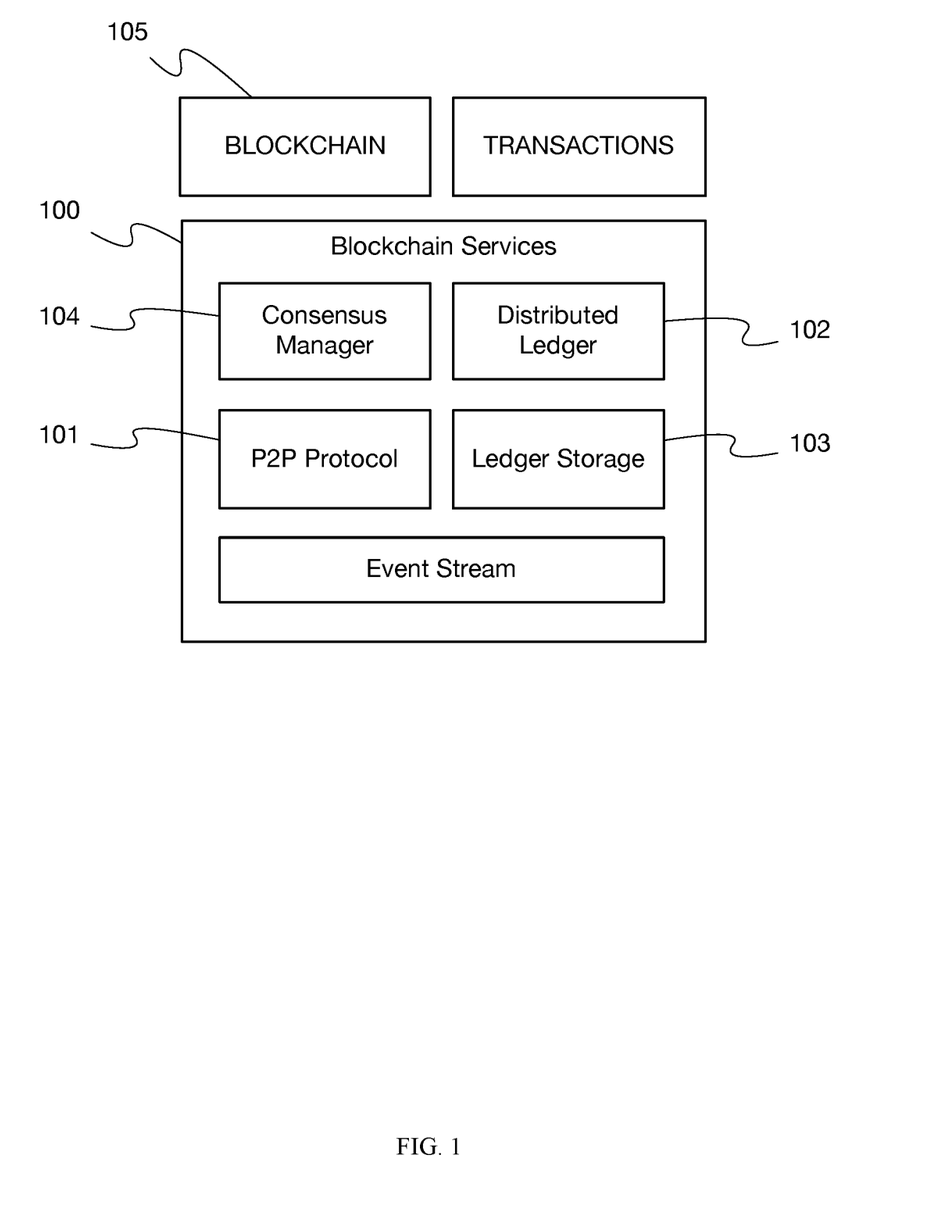
FIG. 1 is a block diagram depicting the Blockchain Services.

FIG. 1 describes the logical components of the blockchain services. Blockchain services 100 consist of a P2P protocol 101, distributed ledger 102, ledger storage 103 and consensus manager 104.

The Consensus Manager 104 is an abstraction that can define the interface between the consensus algorithm and other ledger components. Consensus Manager 104 receives transactions and decides how to organize and when to execute the transactions. Successful execution of transactions results in changes to the ledger.

The Distributed Ledger 102, which can exist in every device in the network, will facilitate chronological analysis and auditing. Consensus is also reached through majority of the ledgers agreeing to the chain creation by stakeholders. Enforcement is achieved by stakeholders committing to be penalized when consensus cannot be reached. The use of the distributed ledger also provides redundancy which can improve fault tolerance and the need for consensus can reduce the effect of collusion.

The blockchains of the present invention can be based on a proof-of-stake algorithm. A deposit, or stake, is required with any transaction request.

Smart contracts can ensure that there are only two possible states for generating an immutable chain on the block. Valid transactions can refund the stake that is required for a transaction and invalid transactions can erode the deposit left for transaction. Smart contracts can also support stored procedures, allowing for contracts to change over time. Requiring a proof of stake can discourage hacking as there will be a cost associated with any invalid transactions. In addition to the proof of stake, other features of this decentralized system can reduce the risk of attack, as to make the request the potential hacker would need to know the identity of the connected device which is only known within the private blockchain. Additionally, the attacker would need to have the proper permissions to access the system, which in this distributed model would require hacking more than half of the nodes of the private blockchain.

Each connected device can be configured to grant access only to permissioned parties, ensuring the integrity of system and can establish a framework of self-declared identity management using cryptography for the purposes of development of Distributed Autonomous Groups.

Figure 7:
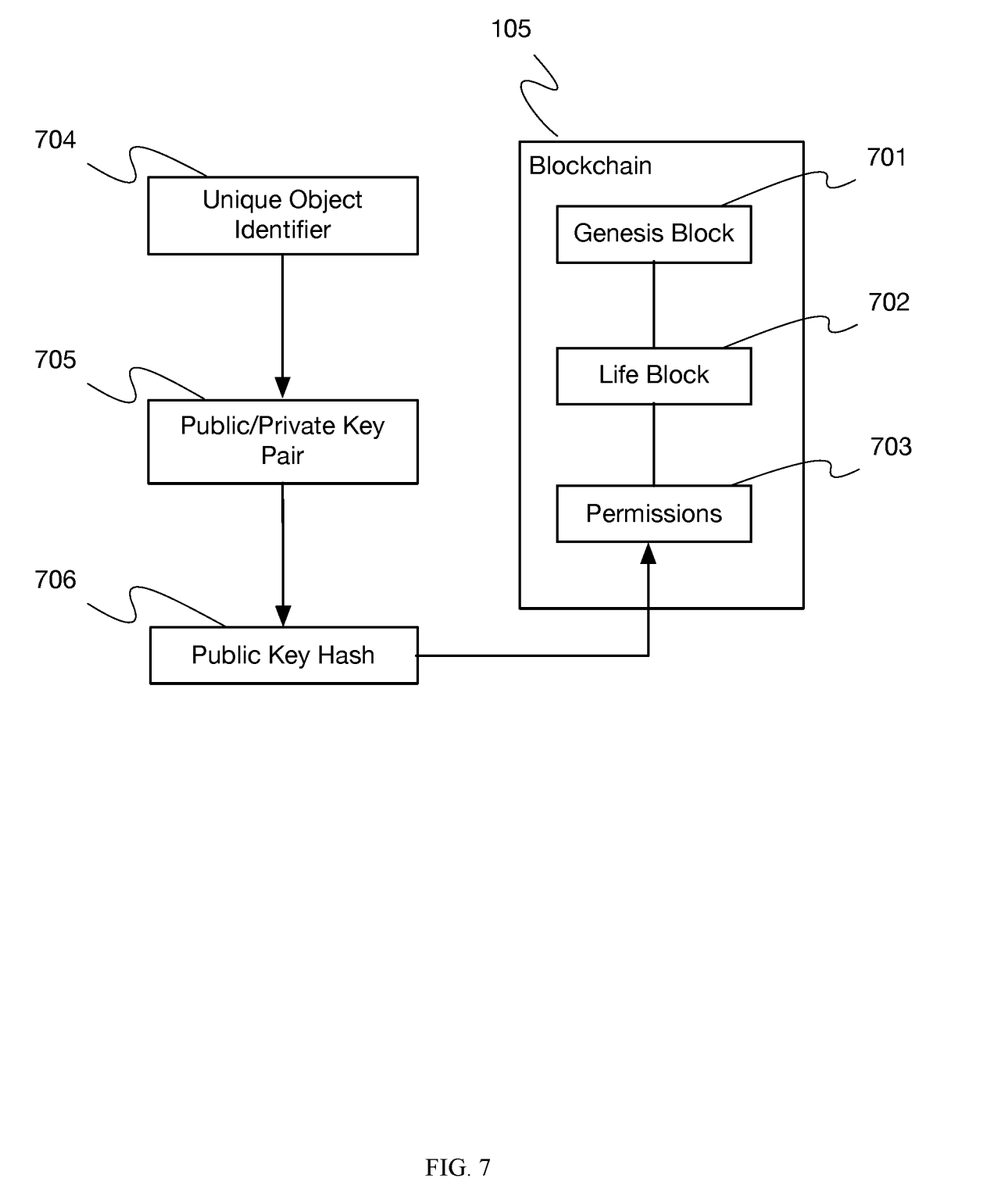
FIG. 7 illustrates the steps in establishing a distributed autonomous self-assigned machine identity system.

FIG. 7 illustrates the steps in establishing a distributed autonomous self-assigned machine identity system. The blockchain 105 is created utilizing a timestamp of each event in conjunction with a genesis block 701 that defines the asset, combined with a life block 702 that defines the authentication along with authorization levels as data for the blockchain. In this example, a machine with a unique qualifier 704 (UUID/MAC address/etc.) creates, by the computer, (1) a genesis block 701 for a blockchain 105; utilizing the unique identity 704 and self-authenticating of that device in conjunction with (2) a public and private key 705; then (3), by the computer, creating a hash of the public key 706 as the main identity (self-identity) of the device or asset; (4) storing this information in the life block 702, creating, by the computer, the next node in the blockchain, such that all the participants in the system require a public key for identification purposes; with the public key being created, by the computer, as a hash being stored in the blockchain for the purpose of being granted permissioned, by the computer, access to the blockchain's smart contract, with the blockchain distributed in a consensus stake driven peer-to-peer network that comprises the system. Self-assigned permissions can be fine grained and enforced by procedures defined in smart contracts that make up the blockchain. In each of the embodiments, a private blockchain can be created which is associated to a particular device or asset. The private blockchain can handle the permissions to the device or asset. It can be through the private blockchain that a user is permitted to send information to a public blockchain. The private blockchain can remain small as the number of users granted access can be small. Keeping the size of the blockchain small can allow the blockchain technology to be used on devices with less computational power and can reduce the latency issues associated with blockchain technology.

Figure 2:
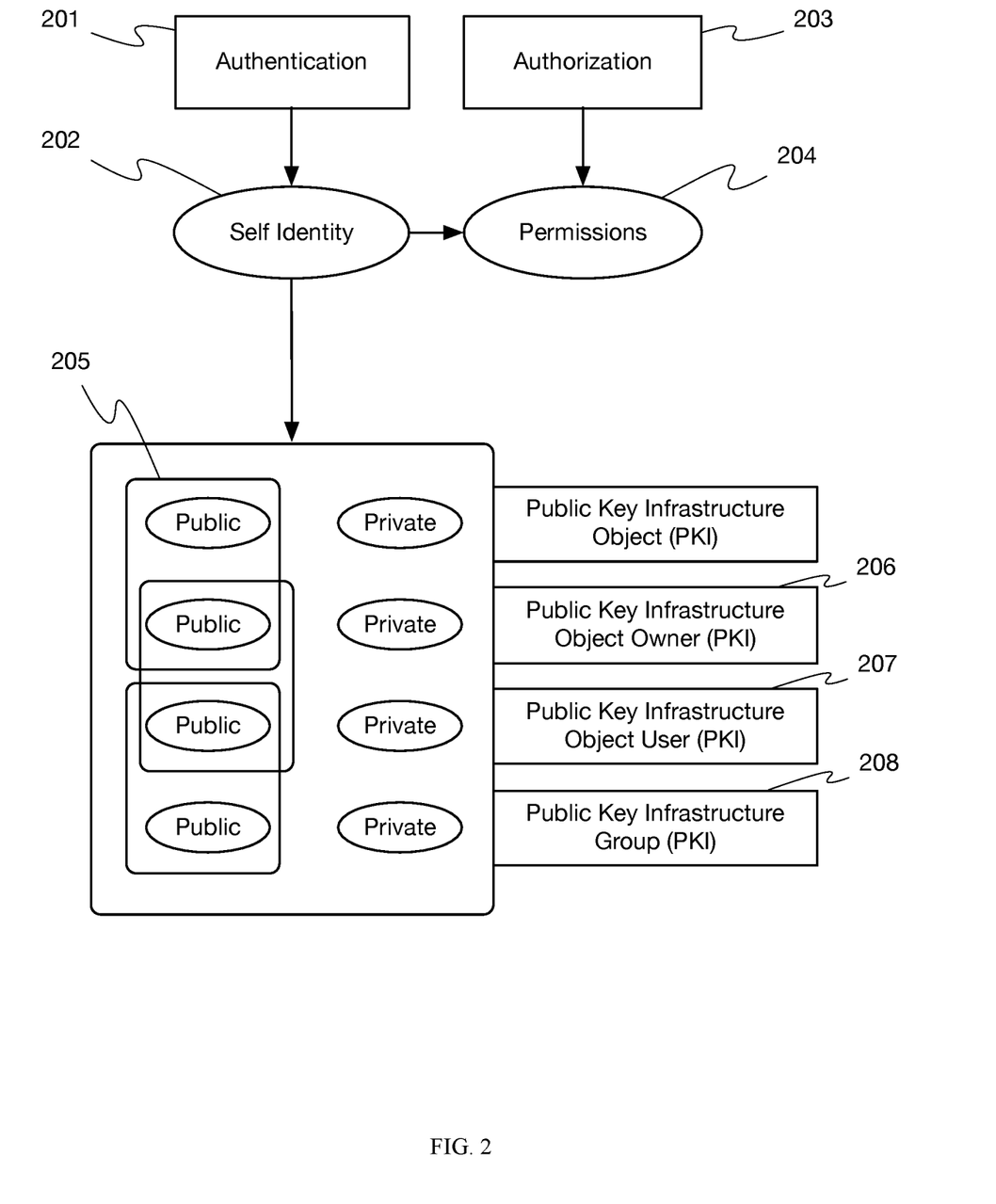
FIG. 2 is block diagram depicting a distributed autonomous self-assigned machine identity system.

FIG. 2 illustrates the method by which Identity Profile, Identity Authentication and Identity Authorization can establish a distributed autonomous self-assigned machine identity system. In this example, utilizing the above described Self-Identity Hash method, Authentication 201 verifies Identify 202 whereas Authorization 203 determines the rules governing interactions determined by permissions 204. Self-Identity 202 utilizes both a public and private key infrastructure, consisting of a connected device object administrator, user and group keys. Group consensus is required to ensure the trustworthiness of all parties and transactions.

Figure 3:
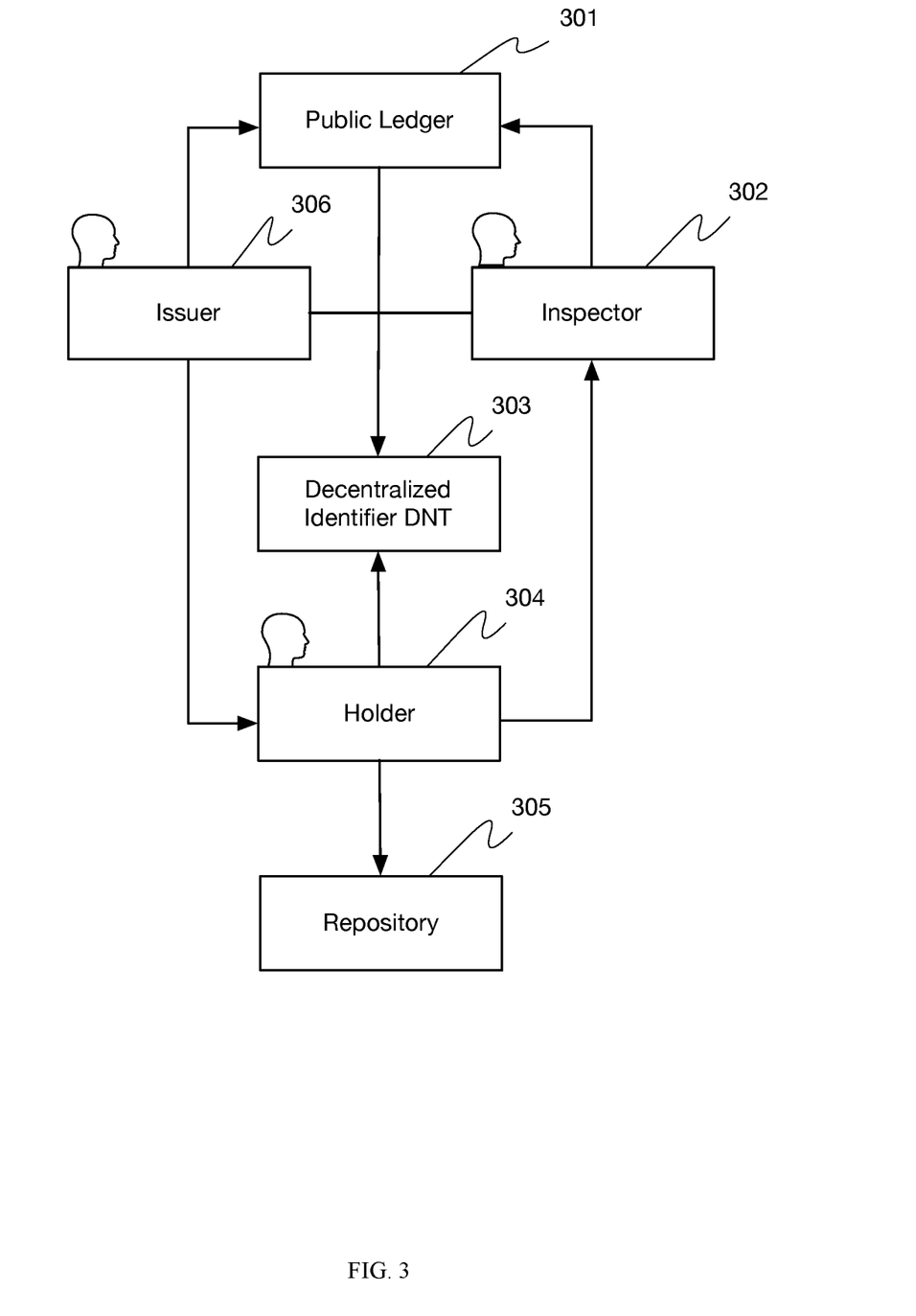
FIG. 3 is a block diagram depicting the Self-Sovereign Identity Architecture.

FIG. 3 illustrates the basic principles of the Self-Sovereign Identity Architecture wherein the issuer publishes public facing verifiable claims to the Public Ledger 301, wherein the Inspector 302 checks the public facing claims. The Decentralized Identifier 303 validates the self-sovereign identity of the holder 304, which is issued verifiable claims, transmitting these to the claims inspector 302, wherein the repository 305 is used to verify claims. This figure illustrates how data is added to the public blockchain. The Issuer 306 can be persons in the private blockchain who have instructed the Holder 304 to add data to the public blockchain. The Holder (connected device) can verify the permissions of the Issuer in the Decentralized Identifier which can be the private blockchain. Once the permissions are verified, the Holder (connected device) can then broadcast the data to the Inspector. The Inspector represents the stakeholders of the blockchain which can verify that the is valid and ensure consensus of the blockchain before the new block is accepted into the blockchain. If consensus is not reached, the proof of stake is forfeited, and the block is not added. If the consensus is reached the proof of stake is refunded and the Holder (connected device) can successfully add the new block to the blockchain, shown as the Repository.

In some embodiments, after the connected device has received its life block 702 and created its identity on the private blockchain, the device can be programmed to function without requiring any further interaction. In this embodiment the connected device would not add an owner to the private block chain. In this embodiment, the connected device would autonomously add data to the public blockchain. This data could include location, sensor data or any other relevant data depending on the type of connected device. The connected device can be configured to identify other connected devices in proximity based on location data and to create a peer to peer network with the other connected devices.

Figure 4:
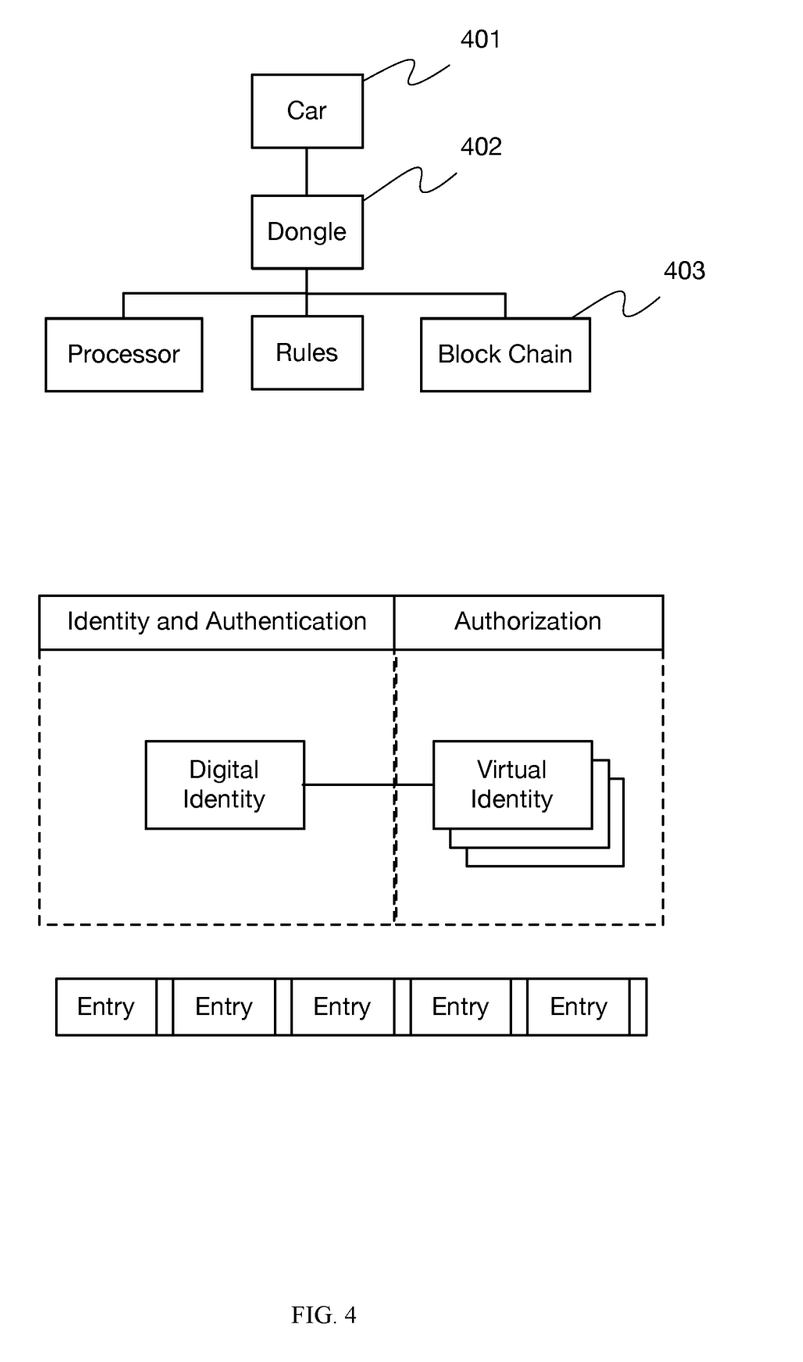
FIG. 4 is a block diagram depicting an embodiment of a distributed autonomous self-assigned machine identity system.

Referring to FIG. 4, in one embodiment, the connected device can be a dongle 402 which can be attached to a vehicle 401 via an interface port such as an OBD-II port. The nature of automotive electronic and electric systems allows a person with physical access to the vehicle (i.e. licensed mechanic) to have full authority over all systems.

However, in the case of 'connected' vehicles, hackers have been able to gain access to vehicle systems using wireless technologies. This is also true of a proxy device; such as an aftermarket wireless router or telematics monitor (dongle) installed in the vehicle 401 which if unsecured can become a vector of attack. The private blockchain 403 for managing permissions to access a connected device and peer-to-peer protocol with cryptographic identities defined by device itself can reduce the vulnerability of a device to hackers. This, in turn, enables electronic interaction in a decentralized manner with auditing capabilities. The use case of the invention as currently embodied is for the administration of vehicle service contracts and can applicable to a wide range of commercial applications and known to one skilled in the art.

FIG. 4 also shows the basic operating principle of the system, wherein the connected device 402 (OBD-II Dongle) containing a CPU and modem is activated upon installation in the OBD-II data port of an operating vehicle 401, whereupon it detects the Vehicle Identification Number (VIN), then communicates by means of a wireless network to a central server, whereupon blockchain software is loaded by means of an over-the-air update.

Figure 5:
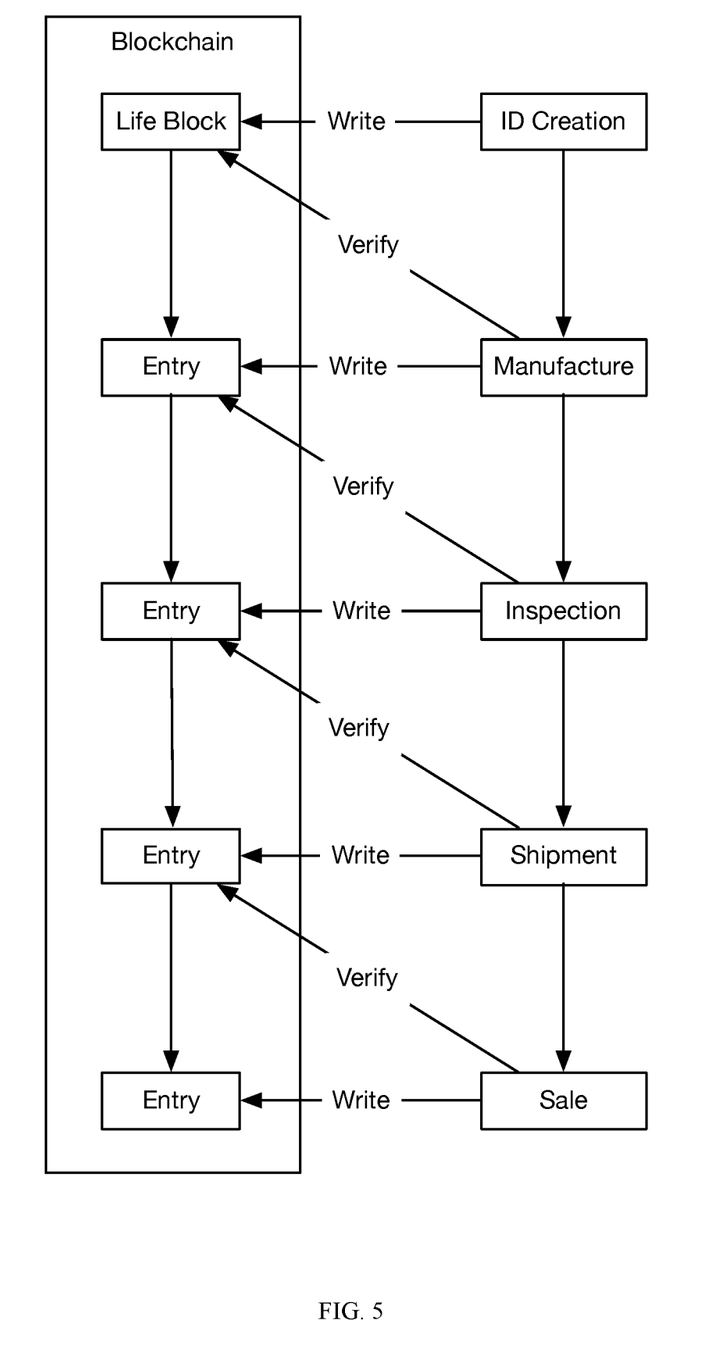
FIG. 5 is a block diagram depicting an embodiment where a manufacturing process is captured on a blockchain.

The Genesis block 701 and Life blocks 702 as previously described are created at the time of registration and can comprise the dongle's 402 digital identity. The dongle, which contains a unique self-assigned machine identity, is linked to its administrator (owner) by means of a mobile app that can scan the connected device's unique ID (such as RF) code to establish individual ownership and rules for management of service claims and controls the permissions for the various virtual identities such as the owner, users, and groups, which are stored in the private blockchain within a Distributed Autonomous Group 205 as illustrated in FIG. 2. The owner controls the permissions for the various virtual identities such as the owner 206, users 207, and groups 208, which are stored in the private blockchain. As shown in FIG. 5, the entries illustrate the chain of blocks in the private blockchain which provides auditing capabilities to the system as each new transaction can add a new block to the chain.

In some embodiments, the software or firmware of a previously deployed connected device can be updated to function as described above. In this embodiment, the connected device can install the update which can include the genesis block for the private blockchain. The connected device can then create its own digital identity. At this stage the connected device can function in the same manner as described above.

In one embodiment, the connected device does not comprise an electronic circuit but can be any product or article of manufacture as illustrated in FIG. 5. In this embodiment, the manufacturer can create a public blockchain. The public blockchain can be distributed among any stakeholders in the logistics supply chain of the manufacturer's products. When a product is manufactured it can be given an identity qualifier as described above. An identifier can be affixed, embedded or otherwise attached or associated with the identity qualifier. This identifier could be any form of identifier capable of storing a reference to the identity of the product. Examples of possible identifiers can include a bar code, QR code, RFID chip or other identifier as is known to those skilled in the art. When the identifier is read for the first time, the manufacturer, by a computer can generate a genesis block for the product. A self-identity can be created for the product based on a public key infrastructure (PKI), utilizing the Self-Identity Hash method as described above. The life block can then be created for the new product. The life block can contain the self-identity of product, a description of the new product, and information regarding the manufacturing, such as the date and location of manufacture. The identifier can be associated to the identity of the product.

The manufacturer can add life block to the private blockchain upon creation of the life block. Permissions can be added to the private block chain for example, when a product is sold, and the purchaser's self-identity hash can be added to the private blockchain. In this manner only authorized users are able to handle the product through the supply chain. At each stage of the logistics supply chain, the identifier of the product can be scanned, and a new block added to the public blockchain containing information regarding the transaction. Such information can include information such as a timestamp, location, sales information, information regarding the products assembly as a component into another object, or other information related to the logistics supply chain.

The adding of a new block to the public blockchain can happen in the manner described above. The party seeking to add the block can provide a proof of stake. If a majority of the ledgers agree to the chain creation of the new block, the block can be considered valid and can be added to the public blockchain. Smart contracts can refund the proof of stake for valid transactions and retain the stake for invalid transactions.

This system and method can be resistant to attack. If a party seeks to counterfeit a product, the counterfeiting party would need to affix an identifier to the product. If the identifier is not associated with a product in the blockchain, it can be easily identified as counterfeit. The counterfeiting party could attempt to affix copied identifier of a valid product, but, as each unique identifier identifies a unique product, the information associated with the counterfeit product would be inconsistent with the data in the public blockchain and could be identified as counterfeit. In addition, the counterfeiting party would lose the stake when attempting to add and invalid block to the blockchain. The distributed nature of the blockchain can make the system more robust as it is not dependent on the manufacturer or other central party maintaining a central server containing the logistics and supply chain information.

Figure 6:
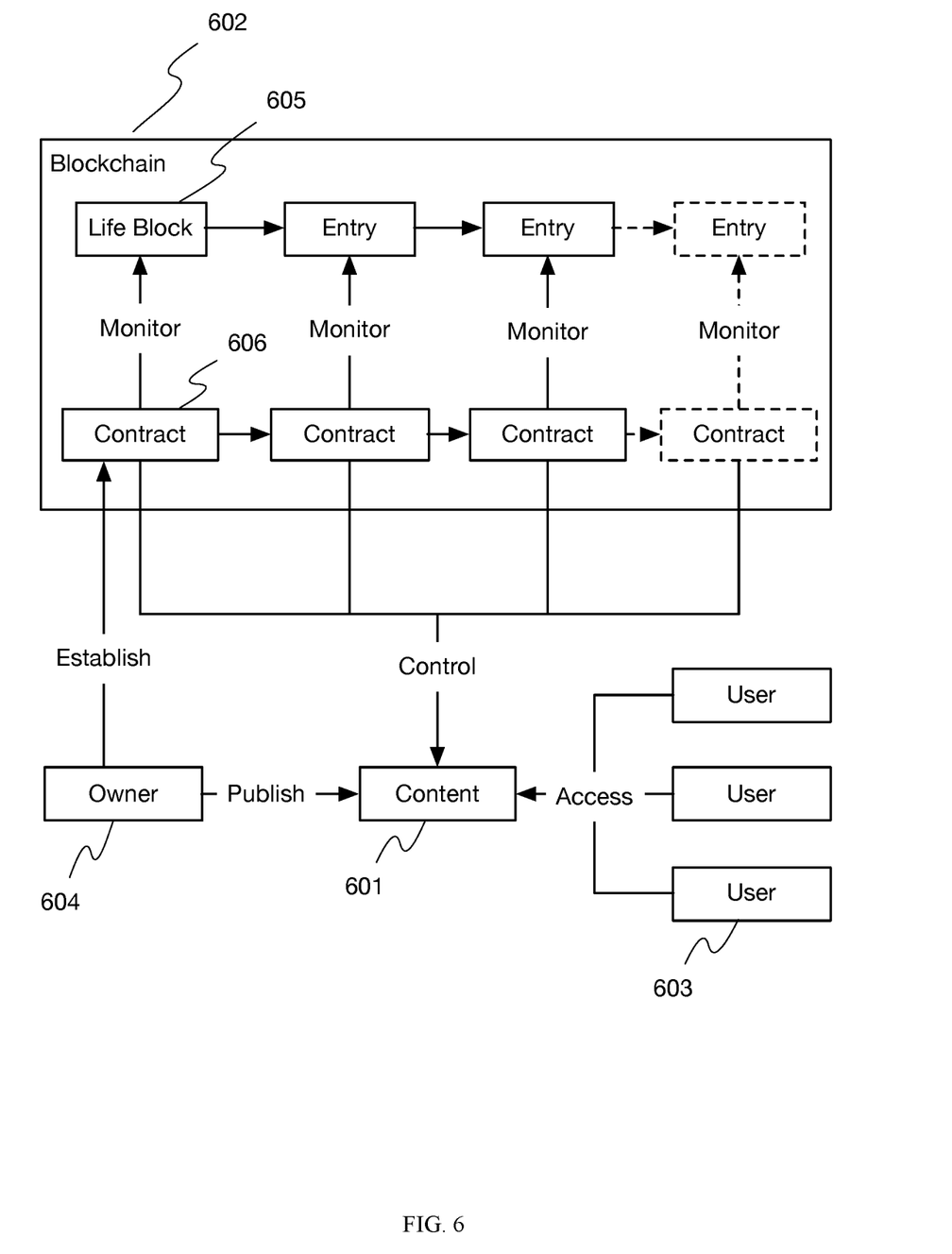
FIG. 6 is a block diagram of an embodiment implementing a DRM mechanism for content.

In another embodiment, the public blockchain can be used for digital rights management (DRM) as illustrated in FIG. 6. The blockchain can be used to provide fine-tuned access to digital assets. As digital assets are sent around the world, using this embodiment, distributors can provide access to the content in a fine tuned manner. By way of example, a movie distributor can provide access to show a particular movie (Content 601) on specific dates and times or for a set number of showings. In this embodiment, a digital asset can be created and given an Identity. A private blockchain 602 associated with the digital asset can be generated as with the previous embodiments. This identity can be based on a public key infrastructure (PKI) utilizing the Self-Identity Hash method as described above. In this embodiment, the content creator 604 can create a public blockchain 602. When a client 603 requests access to a particular digital asset 601, the terms of the contract 606 can be embedded into a life block 605 associated with the contract 606. When access to the digital asset is attempted, in order to access the content, the player can read the identity of the asset and can attempt to add a block to the blockchain, providing a proof of stake as described above. If this transaction is consistent with the contract, then consensus will be that the transaction is valid, and the smart contract will refund the stake and the player will be able to access the content. The smart contract can also execute a procedure regarding the enforcement of the contract. For example, if the contracted permitted a certain number of accesses to the digital asset, the smart contract would decrement the number of remaining accesses under the contract. Another example may be a contract where the receiving party is permitted to access the digital asset any number of times. Each access would be recorded in the public blockchain and the owner of the asset could then bill the client monthly, for example, for the access used by the client.

This embodiment has the same advantages of resistance to attack, and fault protection as the embodiments described above.

In some embodiments, the connected device or other computer system on the network can utilize an Application Specific Integrated Circuit (ASIC) to perform the cryptology functions required by the PKI and the blockchain services. Using such a cryptology ASIC can optimized to perform the cryptology calculations more efficiently than a general purpose processor.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. A method for managing access permissions for a connected device by a user device, the method comprising:
  generating, by a connected device, a public key and a private key for the connected device, the connected device storing in its memory a genesis block for a private blockchain, the genesis block being addressable using a hash of a unique qualifier of the connected device;
  hashing, by the connected device, the public key to provide a self-identity of the connected device;
  adding, by the connected device, a life block to the private blockchain, the life block being added to the private blockchain as a block following the genesis block, the life block being addressable by the hash of the public key, the life block being stored in the memory;
  designating a user device as an owner of the connected device, the user device controlling access permissions to the connected device, and adding a first permissions block to the private blockchain, the first permissions block storing a self-identity of the user device as the owner of the connected device;

adding a further permissions block to the private blockchain, the further permissions block storing access permissions for one or more users of the connected device;

initiating distribution of the private blockchain comprising the genesis block, the life block, and the permissions blocks, to a plurality of peers; and controlling access to the connected device based on the access permissions stored in the private blockchain.

2. The method according to claim 1, wherein an address to a public blockchain is included in the genesis block, the method further comprising the connected device adding to the public blockchain a new block comprising the self-identity of the connected device.

3. The method according to claim 1, wherein the self-identity of the user device is a hash of a public key associated with the user device.

4. The method according to claim 1, wherein the connected device generates the public key and private key and hashes the public key to provide the self-identity when the connected device is powered up for the first time after manufacture.

5. The method according to claim 1, further comprising:
the connected device powering up for the first time after manufacture;
the connected device contacting a central server to obtain an authorization;
wherein the connected device generating the public key and private key and hashing the public key occurs after receiving the authorization.

6. The method according to claim 1, wherein the access permissions to the connected device are controlled by the user device.

7. The method according to claim 1, wherein designating the user device as the owner of the connected device comprises the user device connecting to the connected device.

8. A device, comprising:
at least one hardware processor;
a memory module; and
a wireless communication module,
the at least one hardware processor being configured to implement management of access permissions for the device by a user device, comprising:
generating a public key and a private key for the device;
storing, in the memory module, a genesis block for a private blockchain, the genesis block being addressable using a hash of a unique qualifier of the device;
hashing the public key to provide a self-identity of the device;
adding a life block to the private blockchain, the life block being added to the private blockchain as a block following the genesis block, the life block being addressable by the hash of the public key, the life block being stored in the memory module;
designating a user device as an owner of the device, the user device controlling access permissions to the device, and adding a first permissions block to the private blockchain, the first permissions block storing a self-identity of the user device as the owner of the device;
adding a further permissions block to the private blockchain, the further permissions block storing access permissions for one or more users of the device;
initiating distribution of the private blockchain comprising the genesis block, the life block, and the permissions blocks, to a plurality of peers; and
controlling access to the device based on the access permissions stored in the private blockchain.

9. The device according to claim 8, wherein an address to a public blockchain is included in the genesis block, and the at least one processor is further configured to add to the public blockchain a new block comprising the self-identity of the device.

10. The device according to claim 8, wherein the self-identity of the user device is a hash of a public key associated with the user device.

11. The device according to claim 8, wherein the at least one processor is configured to generate the public key and private key and hash the public key to provide the self-identity when the device is powered up for the first time after manufacture.

12. The device according to claim 8, wherein the at least one processor is configured to cause the device to contact a central server to obtain an authorization when the device is powered up for the first time after manufacture, and is further configured to generate the public key and private key and hash the public key after receiving the authorization.

13. The device according to claim 8, wherein the at least one processor is configured to designate the user device as the owner of the device after the user device is connected to the device.

14. A non-transitory computer-readable medium storing code which, when executed by at least one hardware processor of a device, causes the device to implement:
generating a public key and a private key for the device;
storing, in memory of the device, a genesis block for a private blockchain, the genesis block being addressable using a hash of a unique qualifier of the device;
hashing the public key to provide a self-identity of the device;
adding a life block to the private blockchain, the life block being added to the private blockchain as a block following the genesis block, the life block being addressable by the hash of the public key, the life block being stored in the memory of the device;
designating a user device as an owner of the device, the user device controlling access permissions to the device, and adding a first permissions block to the private blockchain, the first permissions block storing a self-identity of the user device as the owner of the device;
adding a further permissions block to the private blockchain, the further permissions block storing access permissions for one or more users of the device;
initiating distribution of the private blockchain comprising the genesis block, the life block, and the permissions blocks, to a plurality of peers; and
controlling access to the device based on the access permissions stored in the private blockchain.

15. The non-transitory computer-readable medium according to claim 14, wherein an address to a public blockchain is included in the genesis block, and the device is further caused to add to the public blockchain a new block comprising the self-identity of the device.

16. The non-transitory computer-readable medium according to claim 14, wherein the self-identity of the user device is a hash of a public key associated with the user device.

17. The non-transitory computer-readable medium according to claim 14, wherein the device is caused to generate the public key and private key and hash the public key to provide the self-identity when the device is powered up for the first time after manufacture.

18. The non-transitory computer-readable medium according to claim 14, wherein the device is further caused to contact a central server to obtain an authorization when the device is powered up for the first time after manufacture, and is further configured to generate the public key and private key and hash the public key after receiving the authorization.

19. The non-transitory computer-readable medium according to claim 14, wherein the device is caused to designate the user device as the owner of the device after the user device is connected to the device.

\* \* \* \* \*